United States Patent [19]

Porter

[11] 4,119,750
[45] Oct. 10, 1978

[54] SANDWICH PANEL STRUCTURE

[75] Inventor: William Hunt Porter, West Olive, Mich.

[73] Assignee: W. H. Porter, Inc., Holland, Mich.

[21] Appl. No.: 792,808

[22] Filed: May 2, 1977

[51] Int. Cl.² .......................... B32B 5/12; B32B 3/28
[52] U.S. Cl. ...................................... 428/105; 9/6 R; 9/6 W; 9/6 P; 428/71; 428/72; 428/114; 428/184; 428/186; 428/320
[58] Field of Search ............... 428/71, 72, 105, 114, 428/182, 184, 186, 320; 9/6 R, 6 W, 6 P

[56] References Cited

U.S. PATENT DOCUMENTS

| 2,518,550 | 8/1950 | Ives | 428/47 |
|---|---|---|---|
| 2,863,797 | 12/1958 | Meyer | 264/257 |
| 3,080,267 | 3/1963 | Schmalz | 428/322 |
| 3,376,185 | 4/1968 | Shook et al. | 428/47 |
| 3,544,417 | 12/1970 | Corzine | 428/117 |
| 3,573,144 | 3/1971 | Andersen | 428/322 |
| 4,032,689 | 6/1977 | Johnson et al. | 9/6 R |

Primary Examiner—George F. Lesmes
Assistant Examiner—P. J. Thibodeau
Attorney, Agent, or Firm—Emrich, Root, O'Keeffe & Lee

[57] ABSTRACT

A structural panel material of the sandwich-type construction includes inner and outer facings and a core bonded between the facings. The core includes a plurality of blocks of lightweight core material, such as rigid or semi-rigid plastic foam, balsa wood, or a combination of plastic foam. These blocks are arranged in strips. The strips are joined together by corrugated sheet material. In a preferred embodiment, double-sided corrugated paperboard is used to join the lightweight structural strips. The resulting core material has the highly desirable characteristics of being flexible enough to conform to a mold shape under gravity and with the application of little or no external pressure so that special jigs are not required.

19 Claims, 11 Drawing Figures

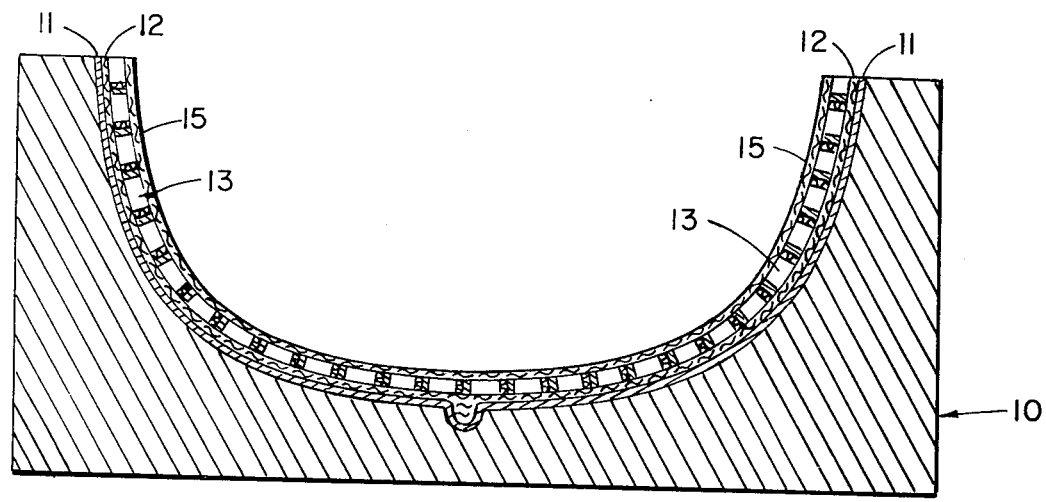
Fig. 1
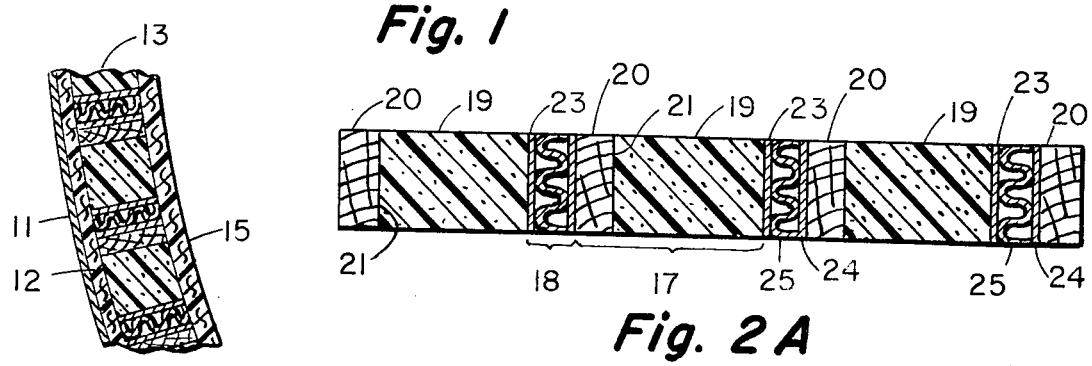
Fig. 2
Fig. 2A
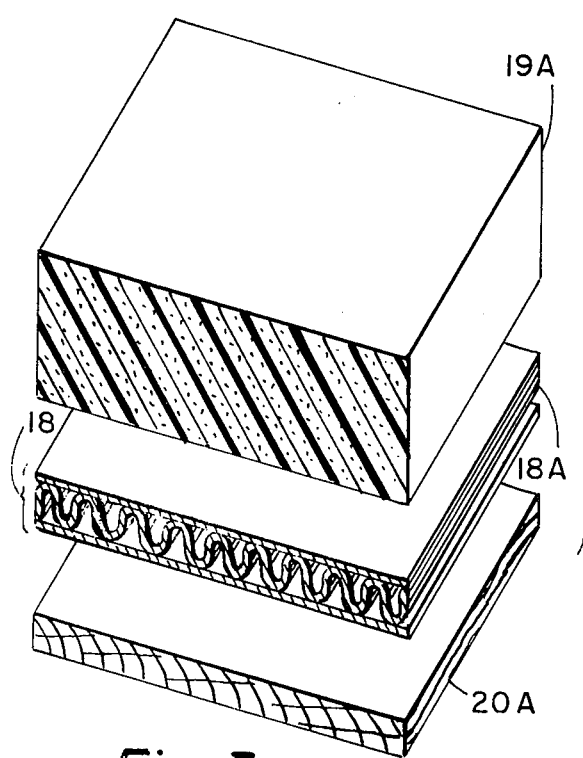
Fig. 3
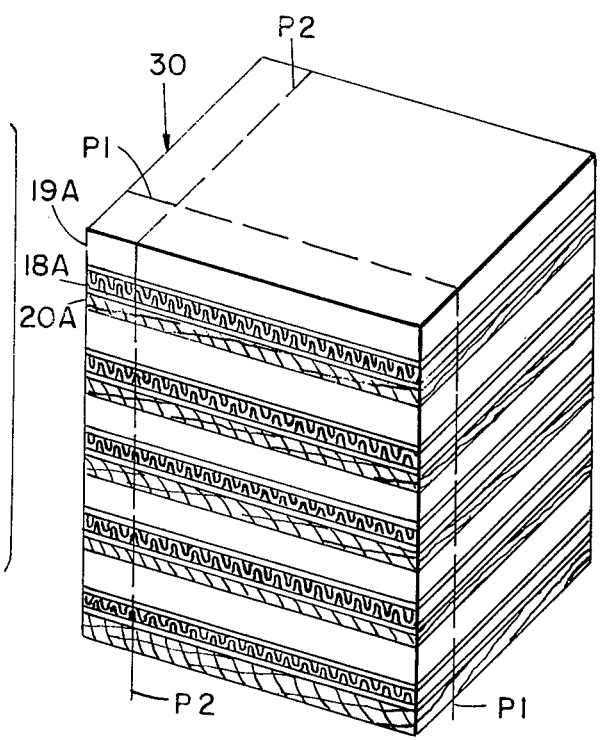
Fig. 4

SANDWICH PANEL STRUCTURE

BACKGROUND AND SUMMARY

The present invention relates to a structural material of the sandwich-type construction. Materials of this type are used primarily to achieve a high strength-to-weight ratio, and they are noted for their stiffness and crush-resistance. Typically, lightweight, bulky, relatively weak materials such as plastic foams are sandwiched between relatively heavy and high strength facing sheets (or simply "facings") such as fiber-reinforced plastic. The facings are bonded to the core, resulting in the "sandwich" characterization.

There are many products which use sandwich panel structures of the type with which the present invention is concerned, such as boat hulls, camper tops, storage tanks, and many others. Further, there are many manufacturing techniques employed in joining the facings to the core. One such technique is herein referred to as "gravity" or "contact" molding. In this manufacturing method, a female or male mold section is waxed, covered with a gel coat (or other finish material), and then a layer of fiberglass reinforcement and polyester resin is applied. Before the resin has cured, a core material is placed in the mold, and a second fiber-reinforced plastic layer is applied to the top of the core material. The composite assembly is permitted to rest until the plastic has cured, during which time the core material becomes bonded to the surface sheets.

In this method of assembly, it is desirable that the core material be flexible enough to conform to the contour of the mold without the application of substantial external pressure (which might require special holding jigs) since this would also require an elaborate mating mold section. In the case of a boat hull, for example, such curvature may be relatively small in certain areas, and it also may be complex—that is, two different degrees of curvature may be required.

Although achieving curvature of the core material in a pressure molding method employing complementary mold sections is not difficult, this has presented a problem in the case of gravity or contact molding of sandwich panel constructions, and there have been attempts to provide flexible core materials in such structures. In gravity molding a slight pressure (such as the weight of an object) might be used to hold the materials in contact until the resin cures.

Some prior attempts to provide flexible cores are shown in U.S. Pat. Nos. 3,139,371; 3,573,144; and 2,036,467. For the most part, such prior attempts require the use of individual block members (of balsa wood, for example) together in one fashion or another, such as with a scrim, to yield flexibility. Such attempts have proved to be expensive and have presented problems in attaching the scrim material to the faces of the blocks. If not properly applied, the scrim may also present a problem in acting as a parting surface for the outer facings applied later.

According to the present invention, the core is made of a plurality of blocks of lightweight core material arranged side-by-side or in strips. The blocks may be of rigid plastic foam (such as polyurethane), balsa wood, or they may themselves be composite structures such as a block of plastic foam laminated to a strip of end grain lumber. The lumber provides additional crush resistance when used with softer rigid foam plastic. The blocks or strips are joined by corrugated sheet material, such as double-sided corrugated paperboard commonly used to make cartons. The flutes of the corrugations may run parallel to the direction of extension of the core strips, or they may run transverse of the direction of extension of the core strips. In either case, it has been found that the resulting core material is flexible to the extent that it will conform to mold shape with little or no external pressure. If greater flexibility is desired, the corrugated sheet material may be crushed either prior or subsequent to its incorporation into the core material or the core material may be scored with a saw to permit the strips to flex.

The present invention thus provides an economical core material for a sandwich panel construction which is flexible enough to conform to a mold in a gravity molding method, but which has the crush resistance and high strength-to-weight ratio of prior constructions. This is achieved because the corrugated material provides a plurality of line connections between the core strips (along the ridges of the corrugations) with flexible material between the line connections. Thus, the corrugated material acts as a hinge between adjacent core strips. The degree of hinge action is increased by using crushed corrugated material, but the degree of flexibility does not appear to depend heavily on the direction in which the flutes of the corrugated material extend. Further, this "hinging" action is two-dimensional—that is, looking from an edge of the core material transverse of the direction of extension of the strips, a forward strip can be rotated counterclockwise, and a rear strip clockwise, and flexibility is apparent.

Other features and advantages of the present invention will be apparent to persons skilled in the art from the following detailed description of a preferred embodiment accompanied by the attached drawing wherein identical reference numerals will refer to like parts in the various views.

THE DRAWING

FIG. 1 is a transverse cross sectional view of a mold section in which materials have been placed to form a sandwich panel construction incorporating the present invention;

FIG. 2 is a close-up view of the sandwich panel construction of FIG. 1;

FIG. 2A is an enlarged view of one embodiment of a core assembly;

FIG. 3 is a perspective view showing the materials used in making the core assembly in exploded relation;

FIG. 4 shows the composite core materials in assembled relation;

DETAILED DESCRIPTION

Figure 5:
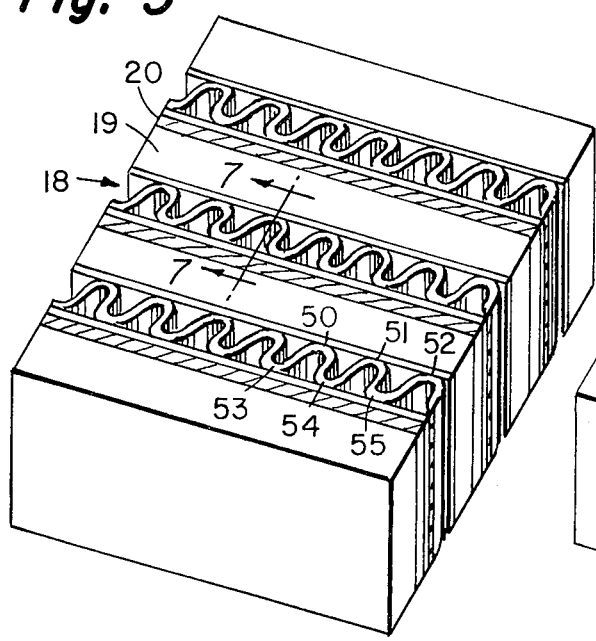
FIGS. 5 and 6 show the core material of the present invention with the flutes of the corrugated material extending in different directions.

Referring first to FIG. 1, reference numeral 10 generally designates a female mold shown in cross sectional form. In this instance, for example, the mold 10 may be used to form a boat hull in a single female mold section without a mating mold section, such as is commonly done in gravity (i.e., contact) molding operations. Persons skilled in the art will readily appreciate that the invention has much broader application, both in the range of products capable of being made according to the invention and the types of methods used. For example, even though the flexibility of the core material has particular application in gravity molding, the same core material may equally well be used in vacuum bagging or matching mold systems.

In forming the article, the mold surface is coated with a wax, and it is then sprayed with a gel coat. The gel coat is a thin film used to provide a high gloss exterior finish and it may also contain color ingredients. A layer of fiber-reinforced plastic (FRP) is then laid by hand over the gel coat. As indicated above, the fiber-reinforced plastic may be a polyester resin with fiberglass strands or matting embedded in the resin. This will form the outer facing of the finished product, and it is designated by reference numeral 12.

While the outer facing of the fiber-reinforced plastic is still liquid (that is, before it has cured), a layer of composite core assembly designated 13 is placed against the outer facing of fiber-reinforced plastic. An inner facing of fiber-reinforced plastic 15 is then placed on the composite core material 13; and the mold is set aside until the fiber-reinforced plastic facings cure.

Referring now to FIG. 2A, the composite core assembly is formed from alternate strips of lightweight core material 17 and corrugated means 18. In this embodiment, the core comprises a strip of semi-rigid plastic foam 19 and a thin strip of end grain lumber 20 laminated together by an adhesive as at 21. The corrugated means, in this instance, comprises double-faced corrugated paper, including first and second flat sheets 23, 24 held together by an undulating or fluted center sheet 25. In this example, the flutes run parallel to the direction of extension of the lightweight core strip 17 (that is, perpendicular to the plane of the page of FIGS. 2 and 2A). However, it has been learned that the flutes may run in the direction of left to right in FIG. 3, as will be discussed more fully presently.

Figure 6:
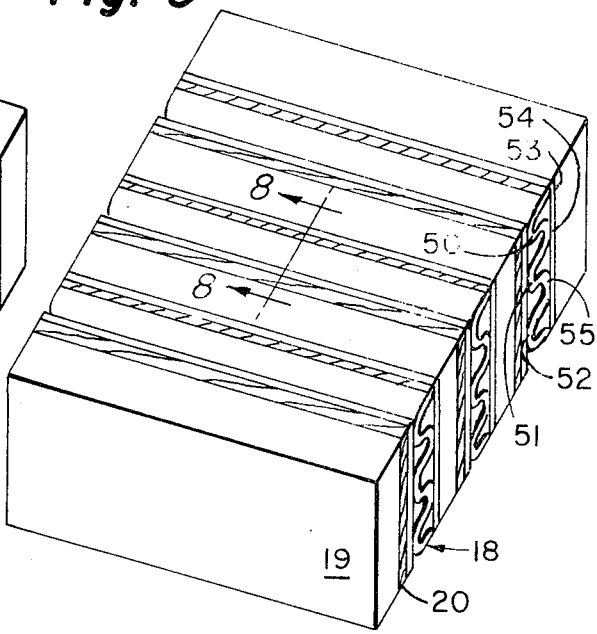

Turning now to FIGS. 3 and 4, the composite core material shown in FIGS. 1–3 may be assembled by laminating separate panels of end grain lumber 20A, layers of double-faced corrugated paper 18A, and slabs of plastic foam 19A. This pattern is repeated, and all of the materials are laminated together with adhesive until a solid stack is formed as shown in FIG. 4 and designated by reference numeral 30. The panels of assembled core material are then formed by cutting along either plane P1 or plane P2. In the first case, the flutes of the corrugations extend transverse of the direction of extension of the lightweight core strips (see FIG. 5); and in the second case, the flutes extend parallel to the direction of extension of the strips of lightweight core material, as seen in FIG. 6.

Figure 7:
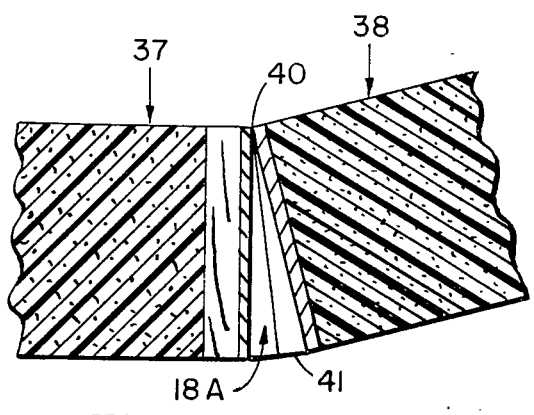
FIG. 7 is a cross sectional view taken through the sight line 7—7 of FIG. 5, but showing adjacent core strips inclined relative to one another.

Turning now to FIG. 7, there is illustrated the hinging action of the corrugated sheet 18A when one strip of lightweight core material 37 is turned relative to a second, similar strip 38. In this illustration the flutes run transverse of the direction of extension of the strips 37, 38. It will be appreciated that one end (40) of the flutes is crushed, while the other end 41 is expanded to provide the hinging action.

Figure 8:
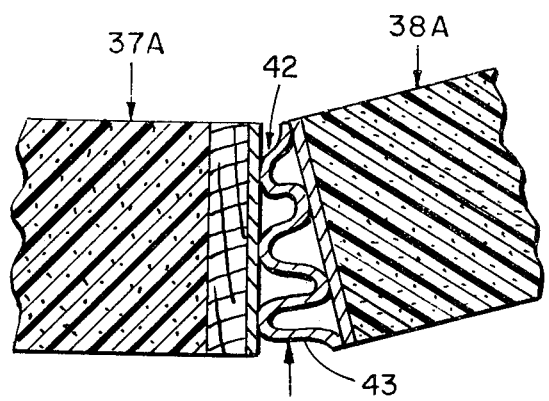
FIG. 8 is a cross sectional view taken through the sight line 8—8 of FIG. 6, again showing the core strips inclined relative to one another.

In FIG. 8, a similar action is shown between two strips 37A and 38A, but in this case, the flutes of the corrugated sheet 18B extend parallel to the direction of extension of the strips 37A, 38A. One section 42 of corrugations is crushed, while another (43) is again extended to permit the hinge action.

Figure 9:
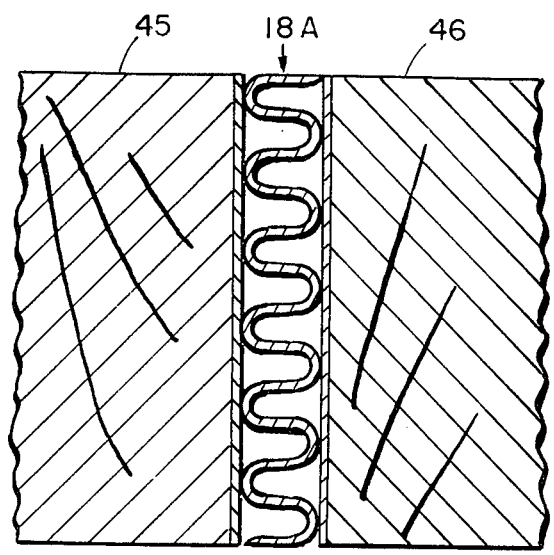
FIGS. 9 and 10 are fragmentary views of a composite core assembly of another embodiment of the invention, before and after crushing of the corrugated material respectively.
Figure 10:
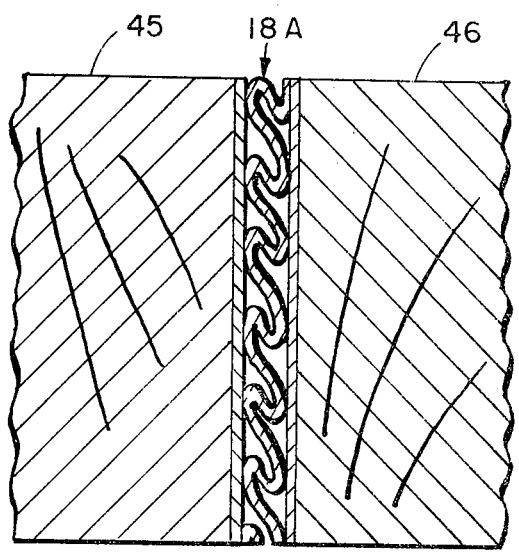

Referring now to FIGS. 9 and 10, there is shown a composite core material comprising a layer of corrugated means 18A and first and second strips of balsa wood 45, 46. FIG. 9 shows the structure before the corrugated layer 18A is crushed; and FIG. 10 shows the same structure after the corrugated layer 18A is crushed. By crushing the corrugated material, greater flexibility is provided for the hinging action just mentioned.

If it is desired to add flexibility along the direction of extension of the strips, the strips may be scored transversely (or even cut to form individual blocks). This may be done while the core material is in large slab form as in FIG. 4 or while such panels are being assembled. One way to think of the core material, whether in the form of FIG. 5 or that of FIG. 6, is that it provides a plurality of lines of attachment with one strip of core material (the ridges 50, 51, 52 in FIGS. 5 or 6) and a second plurality of lines of attachment with the adjacent core strip (ridges 53, 54, 55), and having a flexible sheet or web attached to opposing surfaces of adjacent strips along the two sets of lines (namely, the central fluted material of the double-faced corrugated layer).

Having thus described in detail a number of embodiments of the invention, persons skilled in the art will be able to modify certain of the structure which has been illustrated and to substitute equivalent materials for those disclosed while continuing to practice the principle of the invention; and it is, therefore, intended that all such modifications and substitutions be covered as they are embraced within the spirit and scope of the appended claims.

I claim:

1. In a structural panel material of a sandwich-type construction comprising inner and outer rigid facings and a core between said facings and bonded thereto, the improvement wherein said core comprises a plurality of strips of lightweight core material arranged in parallel relation with opposing lateral surfaces; and double-faced corrugated paperboard sheet material between adjacent ones of said strips and including a center fluted portion having a plurality of undulations connected by means of the facing sheets of said paperboard material alternately to said surfaces, said core being characterized in being flexible enough to conform to a mold shape under gravity and with little or no external pressure.

2. The structure of claim 1 wherein said corrugated sheet material is crushed.

3. The structure of claim 1 wherein said inner and outer rigid facings each comprise fiber-reinforced plastic.

4. The structure of claim 1 wherein the flutes of the corrugations extend parallel to the direction of extension of said strips.

5. The structure of claim 1 wherein the flutes of said corrugations extend transverse of the direction of extension of said strips.

6. The structure of claim 1 wherein the strips of lightweight core material each comprise a strip of rigid foam plastic material and a layer of end grain lumber laminated to said strip of foam plastic material.

7. The structure of claim 1 wherein said strips of lightweight core material comprise rigid plastic foam.

8. The structure of claim 1 wherein said strips of lightweight core material comprise balsa wood.

9. A panel of composite core material for use in a sandwich type of panel structure comprising a plurality of elements of lightweight core material arranged in parallel, spaced strips; double faced corrugated paperboard sheet material between each pair of adjacent strips; and means for attaching the outer surfaces of said paperboard to opposing conforming surfaces of adjacent strips, whereby said corrugated paperboard permits a hinging action between adjacent strips thereby permitting said panel to conform to a mold shape under gravity with little or no external pressure.

10. The structure of claim 9 wherein said corrugated sheet comprises a layer of crushed double-faced corrugated paper with the flutes of the corrugations extending parallel to the direction of extension of said strips.

11. The structure of claim 9 wherein said corrugated sheet material comprises a layer of double-faced crushed corrugated paper with the flutes of the corrugations extending transverse of the direction of extension of said strips.

12. The structure of claim 9 wherein the strips of lightweight core material each comprise a strip of rigid foam plastic material and a layer of end grain lumber laminated to said strip of foam material.

13. The structure of claim 9 wherein said strips of lightweight core material comprise balsa wood.

14. The structure of claim 13 wherein said flexible sheet material comprises crushed corrugated paper.

15. The structure of claim 14 wherein the flutes of the corrugations extend parallel to the direction of extension of the strips.

16. The structure of claim 14 wherein the flutes of the corrugations extend transverse of the direction of extension of said strips.

17. In a structural panel material of a sandwich-type construction comprising inner and outer rigid facings of fiber-reinforced plastic and a core between said facings and bonded thereto, the improvement wherein said core comprises a plurality of strips of lightweight core material arranged with adjacent surfaces of adjacent strips in opposing, parallel relation; and flexible corrugated paperboard including first and second facing sheets and a corrugated center portion, said corrugated portion undulating alternately between adjacent ones of said facing sheets and bonded alternately to said opposing surfaces thereof along spaced lines extending parallel to the undulations thereof, the outer surfaces of said paperboard facing sheets bonded to said opposing surfaces of said strips respectively, said paperboard material defining for each strip a plurality of lines of attachment, said core being characterized in being flexible enough to conform to a mold shape under gravity with little or no external pressure.

18. The structure of claim 17 wherein the strips of lightweight core material each comprise a strip of rigid foam plastic material and a layer of end grain lumber laminated to said strip of foam plastic material.

19. The structure of claim 17 wherein said strips of lightweight core material comprise balsa wood.

* * * * *